(12) United States Patent
Hirmke et al.

(10) Patent No.: US 10,843,371 B2
(45) Date of Patent: Nov. 24, 2020

(54) METHOD OF MAKING A LAMINATED WOOD PRODUCT

(71) Applicant: Stora Enso OYJ, Helsinki (FI)

(72) Inventors: Markus Hirmke, Rossatz-Arnsdorf (AT); Hermann Kirchmayr, Lilienfeld (AT)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 16/345,440

(22) PCT Filed: Oct. 26, 2017

(86) PCT No.: PCT/IB2017/056647
§ 371 (c)(1),
(2) Date: Apr. 26, 2019

(87) PCT Pub. No.: WO2018/078556
PCT Pub. Date: May 3, 2018

(65) Prior Publication Data
US 2019/0275698 A1    Sep. 12, 2019

(30) Foreign Application Priority Data
Oct. 28, 2016  (SE) ...................................... 1651424

(51) Int. Cl.
*B27D 1/00*   (2006.01)
*B27F 1/00*   (2006.01)
(Continued)

(52) U.S. Cl.
CPC .................. *B27M 1/08* (2013.01); *B27D 1/08* (2013.01); *B27F 1/02* (2013.01); *B27M 1/00* (2013.01);
(Continued)

(58) Field of Classification Search
CPC ..... B27D 1/00; B27D 1/08; B27F 1/00; B27F 1/02; B27M 1/00; B27M 1/02;
(Continued)

(56) References Cited

U.S. PATENT DOCUMENTS

| 357,521 A | 2/1887 | Byrkit |
| 3,427,216 A * | 2/1969 | Quinn .................... E04C 2/24 |
| | | 428/337 |

(Continued)

FOREIGN PATENT DOCUMENTS

| CN | 101357470 A | 2/2009 |
| DE | 553854 | 7/1932 |

(Continued)

OTHER PUBLICATIONS

Machine Translation of EP-2535155-A1, Dec. 2012 (Year: 2012).*
(Continued)

*Primary Examiner* — Jacob T Minskey
*Assistant Examiner* — Matthew Hoover
(74) *Attorney, Agent, or Firm* — Greer, Burns & Crain, Ltd.

(57) ABSTRACT

The present disclosure relates to a method of producing a laminated wood product, comprising providing a plank presenting a pair of parallel major surfaces, a pair of minor surfaces, a pair of end surfaces and a longitudinal direction parallel with said major and minor surfaces and perpendicular to the end surfaces, said plank having a water content of more than 25% by weight, preferably more than 30% by weight, initializing at least one longitudinal crack in the plank, drying said crack initialized plank to a moisture content of less than 20% by weight, and laminating said crack initialized plank by gluing at least one of its major surfaces to a surface of a second member, thus forming the laminated wood product. The disclosure also relates to a (Continued)

laminated wood product, which may be formed according to the method.

30 Claims, 8 Drawing Sheets

(51) Int. Cl.
| | |
|---|---|
| *B27M 1/00* | (2006.01) |
| *B27M 3/00* | (2006.01) |
| *B32B 7/00* | (2019.01) |
| *B32B 21/00* | (2006.01) |
| *E04C 2/00* | (2006.01) |
| *E04C 3/00* | (2006.01) |
| *B27M 1/08* | (2006.01) |
| *B27F 1/02* | (2006.01) |
| *B32B 7/12* | (2006.01) |
| *B32B 21/04* | (2006.01) |
| *E04C 2/12* | (2006.01) |
| *B32B 21/14* | (2006.01) |
| *E04C 3/12* | (2006.01) |
| *B27D 1/08* | (2006.01) |
| *B27M 1/02* | (2006.01) |
| *B32B 21/13* | (2006.01) |

(52) U.S. Cl.
CPC ............... *B27M 1/02* (2013.01); *B27M 3/00* (2013.01); *B27M 3/0026* (2013.01); *B27M 3/0053* (2013.01); *B32B 7/12* (2013.01); *B32B 21/04* (2013.01); *B32B 21/042* (2013.01); *B32B 21/13* (2013.01); *B32B 21/14* (2013.01); *E04C 2/12* (2013.01); *E04C 3/122* (2013.01); *B32B 2250/03* (2013.01); *B32B 2250/40* (2013.01)

(58) Field of Classification Search
CPC ...... B27M 1/08; B27M 3/002; B27M 3/0026; B27M 3/005; B27M 3/0053; B32B 7/00; B32B 7/10; B32B 7/12; B32B 21/00; B32B 21/04; B32B 21/042; B32B 21/10; B32B 21/13; B32B 21/14; E04C 2/00; E04C 2/10; E04C 2/12; E04C 3/00; E04C 3/10; E04C 3/12; E04C 3/122
See application file for complete search history.

(56) References Cited

U.S. PATENT DOCUMENTS 4,747,899 A * 5/1988 Hasegawa ................ B27G 1/00
156/160
2013/0183477 A1* 7/2013 Leitinger ............. B27M 3/0053
428/58

FOREIGN PATENT DOCUMENTS

| | | | |
|---|---|---|---|
| EP | 2535155 | * | 12/2012 |
| EP | 2535155 A1 | * | 12/2012 ............... B27G 1/00 |
| GB | 2058315 A | | 4/1981 |
| JP | 2014113748 | | 5/1988 |
| JP | H09070803 | | 3/1997 |
| WO | 200206041 A1 | | 1/2002 |

OTHER PUBLICATIONS

Supplementary European Search Report, for Application No. 17864276. 5, dated Jun. 9, 2020.
International Searching Authority, Written Opinion of the International Searching Authority, PCT/IB2017/056647, dated May 3, 2018.
International Searching Authority, International Search Report, PPCT/IB2017/056647, dated May 3, 2018.

* cited by examiner

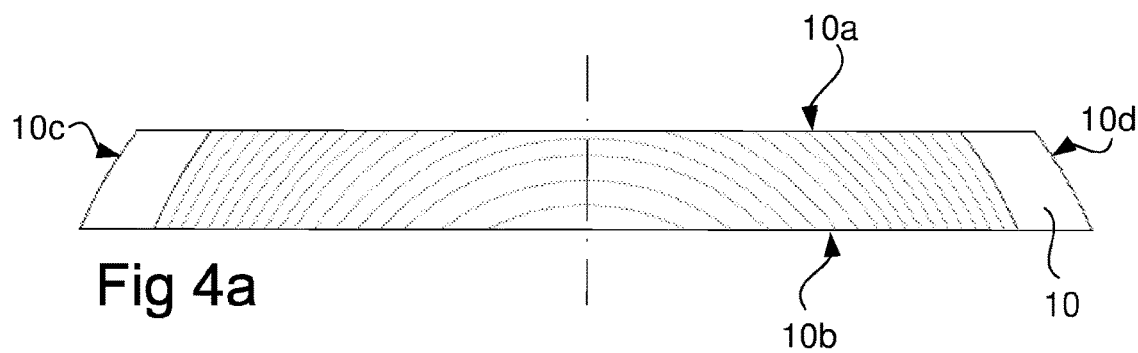
Fig 4a
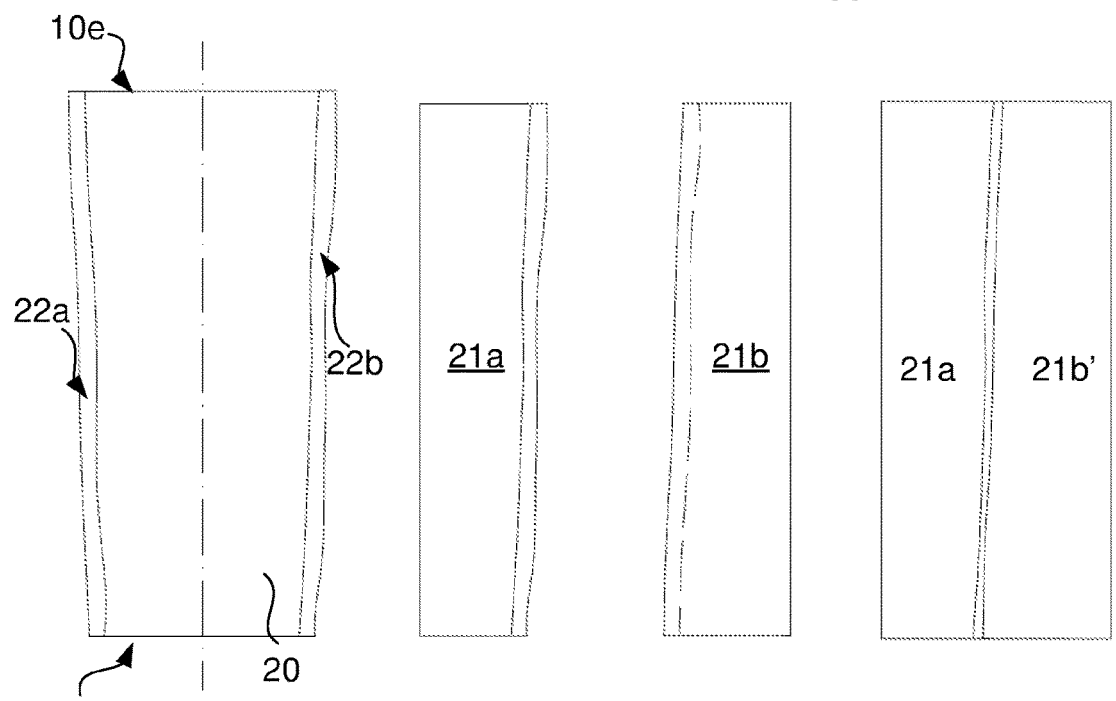
Fig 4b
Fig 4c
Fig 4d
Fig 5a
Fig 5b
Fig 5c

METHOD OF MAKING A LAMINATED WOOD PRODUCT

This application is a U.S. National Phase under 35 U.S.C. § 371 of International Application No. PCT/IB2017/056647, filed Oct. 26, 2017, which claims priority under 35 U.S.C. §§ 119 and 365 to Swedish Application No. 1651424-2, filed Oct. 28, 2016.

TECHNICAL FIELD

The present disclosure relates to a method of making a laminated wood product, and to a wood product which can be made according to this method.

The method is specifically suitable for processing of so-called hardwood, but may also be used for softwood.

BACKGROUND

One of the most frequently used wood species for construction is spruce or Norway spruce. However, a trend is that the proportion of spruce in European forests is declining.

On the other hand, the proportion of beech, and in particular red beech, is increasing.

As such, beech is attractive, because of its strength properties, which are actually superior to those of spruce.

Beech, however, exhibits more shrinkage than e.g. spruce and is thus more prone to deforming (twisting, bowing, cupping, crooking) in connection with drying than spruce. Hence, dried planks of beech call for more removal of material in order to achieve planar planks, than corresponding planks of spruce. Hence, processing of beech is associated with greater material losses than processing of spruce.

FIG. 1 illustrates how different plank or rod geometries 1a, 1b, 1c, 1d, 1e, 1f may be cut from a piece of raw material in the form of a wooden log 1. As is readily visible from FIG. 1, the orientation of the year rings will differ between different parts of the cross section. As a consequence, planks or rods cut from different parts of the log will deform differently as they dry, as indicated in FIG. 1.

FIGS. 2a-2b schematically illustrate how a log 1 is typically cut into a plurality of planks.

As illustrated in FIG. 2a, the log 1 may be cut along a plurality of parallel longitudinal planes, such that a plurality of wood planks 10 are formed.

As illustrated in FIG. 2b, the log 1 may be cut into planks 11 along one or more first longitudinal planes, and then subsequently along one or more second longitudinal planes perpendicular to the first longitudinal planes. In the embodiment illustrated in FIG. 2b, one first longitudinal cutting plane is provided, whereby the log is cut in halves having a respective semicircular cross section, and subsequently eight second longitudinal cutting planes, which are all perpendicular to the first one, and typically equally spaced from each other.

Again, it can be seen that each plank will have its unique properties and thus its unique deformation when drying.

FIG. 3 schematically illustrates a cross section of a cupped plank 10. Such cupping typically occurs during the drying process. From FIG. 3, it can be deduced how much material would need to be cut away in order to provide a plank 101 having a rectangular cross section. In reality, losses of about 40-50% are not uncommon.

In view of the above, there is a need for a method which reduces the loss of material and thus allows for more efficient use of beech as a construction material.

SUMMARY

An objective of the present disclosure is to provide a method which reduces the loss of material and thus provides for more efficient use of beech, and other hard and soft woods as a construction material.

The invention is defined by the appended independent claims, with embodiments being set forth in the appended dependent claims, in the following description and in the attached drawings.

According to a first aspect, there is provided a method of producing a laminated wood product, comprising providing a plank presenting a pair of parallel major surfaces, a pair of minor surfaces, a pair of end surfaces and a longitudinal direction parallel with said major and minor surfaces and perpendicular to the end surfaces, said plank having a water content of more than 25% by weight, preferably more than 30% by weight. Initializing at least one longitudinal crack in the plank, drying said crack initialized plank to a moisture content of less than 20% by weight, and laminating said crack initialized plank by gluing at least one of its major surfaces to a surface of a second member, thus forming the laminated wood product.

Thanks to the invention, a method of controlling the initiation of cracks in a plank is provided, both with regards to the location of a crack as well as to the number of cracks to be created. In the context of a log or a plank, the term "longitudinal" is understood to refer to a direction which is substantially parallel with a main fiber direction of such log or plank. The term "substantial" here reflects that fibers are not always perfectly straight throughout the log or plank, and that there may be local variations in fiber direction, e.g. due to knots or other defects.

Moreover, in the context of a plank, the term "width" is understood to refer to a direction that is perpendicular to the longitudinal direction, parallel with a major cut surface of the plank.

In the context of a plank, the term "thickness" is understood to refer to a direction which is perpendicular to the major cut surface of the plank.

A "plank" is a typically elongate piece of sawn lumber, which is formed of one piece of lumber and which is integral. That is, all pieces making up a plank remain connected, albeit with cracks and partial separations, and thus have not been artificially joined together.

Water content is expressed herein in the, for wood, conventional way, i.e. in proportion to the dry weight of the wood. That is moisture content=(wet weight−dry weight)/(dry weight).

An initialized crack means that the plank has been provided with a notch or dent from which a crack may start propagating.

The second member may be one or more planks, a wood fiber based board, a chipboard, a film, a web, etc.

The invention is based on the insight that, in many circumstances, longitudinal cracks are more of an optical, or aesthetic, problem than a strength problem.

Hence, in a laminated structure, where some or all lamellae have longitudinal cracks, the strength properties may nevertheless be equal, or close to equal, to a laminated structure lamellae that are non-cracked. Hence, the cracks do not prevent the fiber strength from being utilized.

By initiating cracks, and incorporating these initiated cracks in the laminated product when the product is being laminated in wet state, the deformation that normally takes place during drying will have little or no effect on the finished product.

Moreover, by initiating cracks in sawn goods and allowing cracks to form during drying, the overall yield may be increased.

In addition, cracked planks may allow for faster drying.

The initializing may comprise wedging into the plank.

The wedging may be performed towards at least one of the end surfaces.

In particular, the wedging may comprise applying a force by a wedge member in a direction +/−45°, preferably +/−30°, +/−10° or approximately perpendicular, to a surface normal of the end surfaces.

The wedging may be performed with a wedge edge, which is oriented substantially perpendicular to the major surfaces.

In one example, the wedging may be performed with a wedge edge, which is oriented substantially perpendicular to a year ring tangent where the wedge engages the end surface.

The wedge edge may be driven into the end surface less than 5% of a plank length, preferably less than 1% or less than 0.1% of the plank length.

In reality, the wedges may be driven only a few centimeters, or even millimeters, into the end surface.

As an alternative, or supplement, the initializing may comprise providing a longitudinal notch in at least one of the major surfaces.

The longitudinal notch may comprise wedging or cutting into the major surface.

The longitudinal notch may comprise sawing or milling into the major surface.

The notch may be continuous over at least 50% of a length of the plank, preferably over at least 70% or at least 90%.

The notch may be discontinuous and presents at least two aligned notch sections of less than 45% of a length of the plank, preferably less than 30% or less than 10%.

The notch sections may be aligned longitudinally along the plank, or along a feature of the plank, such as a year ring or a fiber.

A notch depth may be less than 90% of a plank thickness, preferably less than 30%, less than 20% or less than 10%.

In reality, notch depth may be on the order of 0.5-5 mm.

The method may further comprise measuring a wedging force, whereby the wedging may be performed until the wedging force starts decreasing.

As another option, the initializing may comprise cutting into the plank.

The cutting may comprise removing material in the form of dust or chips.

The cutting may be performed towards an end surface of the plank.

Alternatively, or as a supplement, the cutting may be performed towards a major surface of the plank.

At least two laterally spaced cracks may be initiated along respective longitudinal directions of one major surface.

The cracks may be spaced apart by a distance corresponding to a thickness of the plank +/−25%, preferably +/−10%.

The method may further comprise obtaining data on fiber directions of at least part of the at least one of the major surfaces and initiating at least one crack parallel with such fiber direction.

The method may further comprise opening at least one initiated crack.

Such opening may comprise applying a torque about an axis parallel with the longitudinal direction of the plank.

The plank may, prior to said drying, have a water content of less than 40% by weight, preferably less than 35% by weight.

That is, free water may already have been removed, leaving bound water only.

In one embodiment, the laminating may be performed before the drying step.

The second member may present a water content of less than 25% by weight, preferably less than 20% by weight.

Alternatively, the second member may present a water content of more than 25% by weight, preferably more than 30% by weight.

The method may further comprise a sanding step and/or a planing step of at least one of the major surfaces after the drying and prior to the laminating.

In another embodiment, the laminating may be performed after the drying step.

Alternatively, the second member may present a water content of less than 25% by weight, preferably less than 20% by weight.

The plank may be formed of hardwood, i.e. from an angiosperm tree species, having a dry wood density of more than 400 kg/m$^3$.

"Dry wood" is defined as wood having a moisture content that is typical to commercial lumber, i.e. wood which has been air-dried or kiln-dried. Usually this moisture content may be on the order of 8-18% by weight.

According to a second aspect, there is provided a laminated wood product, comprising a first layer which is formed of at least one hardwood plank presenting a pair of parallel major surfaces, a pair of minor surfaces, a pair of end surfaces and a longitudinal direction parallel with said major and minor surfaces and perpendicular to the end surfaces, said plank having a water content of less than 25% by weight, and said plank presents a pair of juxtaposed plank portions, at least partially separated by an open gap running along a fiber direction of the plank, said gap presenting crack surfaces; and at least one second layer, laminated to the major surface.

A crack surface is a surface of a crack or split of the wood, and may be recognized in that it is generally irregular and generally follows the fiber direction of the wood without cutting off the fibers. Cracks and splits are characterized in that originally adjacent wood fibers have been separated in a direction perpendicular to their longitudinal directions without removal of material.

It is to be understood that an "open gap" herein refers to that the crack surfaces are physically separated by said gap, i.e. at the position of a gap the respective crack surfaces are not connected to each other for example by means of any filling material or substance.

The crack may present a depth from at least one major surface of 5-100% of a thickness of the plank, preferably of 5-90% of a more preferably 10-50%.

The laminated wood product may further comprise at least two second layers, which sandwich said plank. The two second sandwiching layers may be non-cracked. The at least two second layers may present fiber directions which are substantially perpendicular to the fiber direction of the plank.

In one embodiment a plank forming part of the second layer may extend across the gap. That is, a plank forming part of the second layer may be offset in its width direction relative to the plank of the first layer.

Alternatively, at least two second layers may present fiber directions which are substantially parallel to the fiber direction of the plank.

In one embodiment, said gap running along a fiber direction of the plank is an open crack, meaning that a non-filled gap is created between the two inner longitudinal side surfaces of a crack. It is to be understood that "non-filled" is to be interpreted as "empty" or "void of any filling material or substance". An embodiment wherein the cracks are unfilled leads to the advantage that any natural dimensional changes of the wood e.g. in the form of shrinking and swelling caused by changes in humidity are tolerated thus avoiding undesired tension in the plank and/or the upcome of uncontrolled cracks. By providing open spaces inside the planks, any swelling or shrinking will mainly occur inside the plank and build-up of tensions in the material is minimized. Also the fact that the cracks are open leads to that water vapor may be ventilated through the air inside the cracks to/from the wood tissue upon humidity changes.

Thanks to the invention there is provided a wood product with an improved tolerability of variations in humidity while at the same time not reducing the strength properties.

BRIEF DESCRIPTION OF THE DRAWINGS

FIG. 4a is a schematic cross sectional view of a plank.

FIGS. 4b-4d are schematic planar views of the plank illustrated in FIG. 4a.

FIGS. 5a-5c are schematic planar views of a plank.

DETAILED DESCRIPTION

Figure 1:
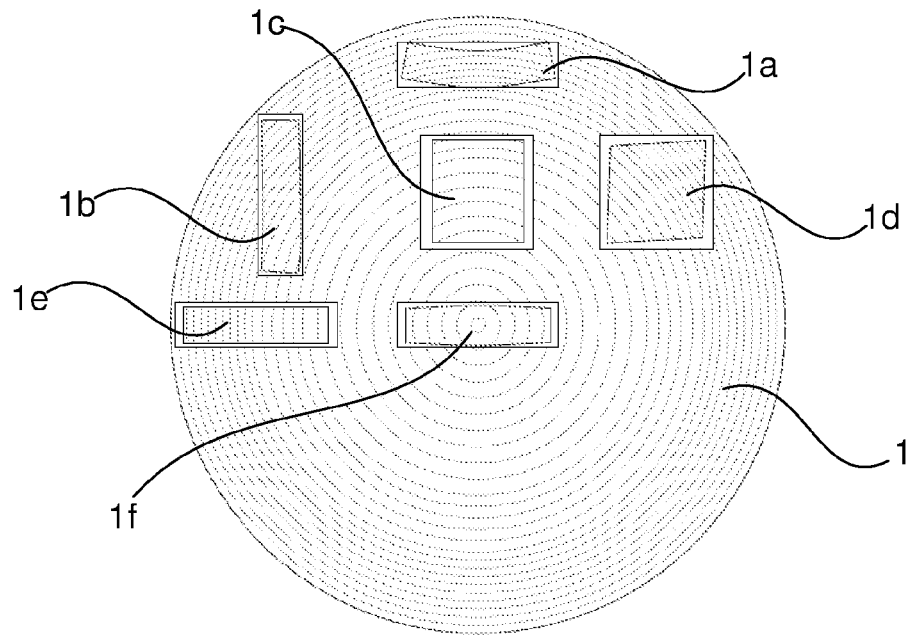
FIG. 1 is a schematic cross sectional view of a log.

FIGS. 4a-4d and 5a-5b show a strategy to increase the overall yield: If you would leave the boards intact (FIG. 4b) there will be no two identical boards, so it will be very difficult to fit them together into a layer with small gaps. Normally you would trim the edges to get boards with parallel edges. On the other hand most boards can be split symmetrically in the middle, so that the two halves can be fit together nicely, as illustrated, which results in a layer where you have rather small gaps between the boards and small trimming waste.

FIGS. 4a-4d schematically illustrate how an approximately trapezoidal plank 20 may be cut longitudinally and rearranged in order to provide an approximately rectangular aggregate panel.

For example, the plank 20 may be cut along a longitudinal line, thereby forming a pair of plank pieces 21a, 21b. By shifting positions of the plank pieces 21a, 21b such that their rounded edges face each other and also turning one of the plank pieces 21b about 180° about an axis that is parallel with the plank's 21b width direction W (and thus perpendicular to its length direction), the plank pieces may be arranged with their respective longitudinal cut edges parallel and with a minimum gap between the plank pieces 21a, 21b. Moreover, the rounded edges 22a, 22b may wholly or partially overlap each other.

FIGS. 5a-5c schematically illustrate how a bent plank 30 may be cut and rearranged to provide an approximately rectangular aggregate panel.

For example, the plank 30 may be cut along a longitudinal line to form a pair of plank pieces 31a, 31b of which one has a convex longitudinal edge 32a and the other one has a concave longitudinal edge 32b.

By shifting positions of the plank pieces 31a, 31b such that their rounded edges face each other and also turning one of the plank pieces 31b about 180° about an axis that is parallel with the plank's 31b width direction W (and thus perpendicular to its length direction), the plank pieces may be arranged with their respective longitudinal cut edges parallel and with a minimum gap between the plank pieces 31a, 31b. Moreover, the rounded edges 32a, 32b may wholly or partially overlap each other. The principles of FIGS. 4a-4d and 5a-5c can be used in order to optimize use of planks when forming, in particular, cross laminated timber products.

A plank typically presents a pair of substantially planar, mutually parallel major surfaces, a pair of minor surfaces and a pair of end surfaces. A longitudinal direction L is defined as the direction between the end surfaces. Hence, the major surfaces extend substantially parallel with the longitudinal direction, as do the minor surfaces.

The plank has a thickness direction T, perpendicular to the major surfaces and a width W, perpendicular to both the major surfaces and to the thickness.

Plank length (L direction) may be on the order of 200-10000 mm, most often about 1000-5000 mm. Plank thickness (T direction) may be on the order of 5-50 mm, most often about 10-40 mm. Plank width (W direction) may be on the order of 30-1000 mm, most often about 50-500 mm.

The plank's major surfaces may be rectangular or trapezoidal in shape.

The minor surfaces, may, but need not be mutually parallel.

A principal fiber direction of the plank may extend substantially parallel with the longitudinal direction, i.e. parallel+/−20°, preferably +/−10° or +/−5°.

The end surfaces may be substantially perpendicular to at least one of the major and minor surfaces.

The description will now focus on a concept of forming a laminated wood product.

Figure 2A:
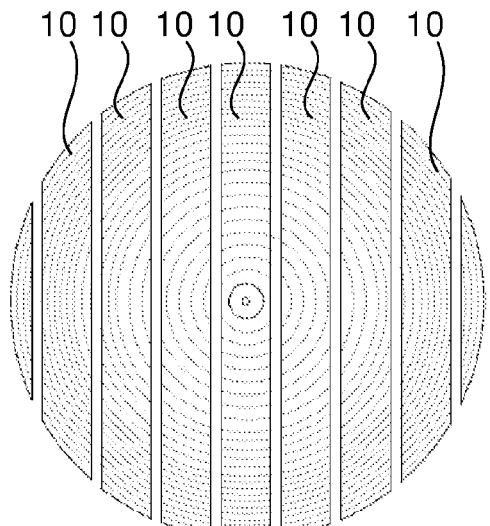
FIGS. 2a-2b are schematic cross sectional views of a log, which has been cut into a plurality of planks.
Figure 2B:
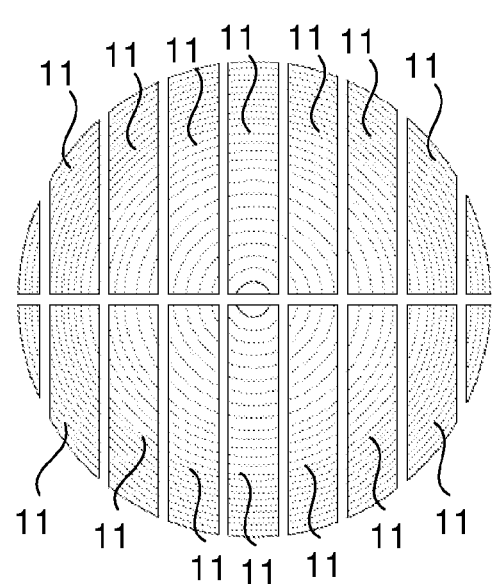
Figure 3:
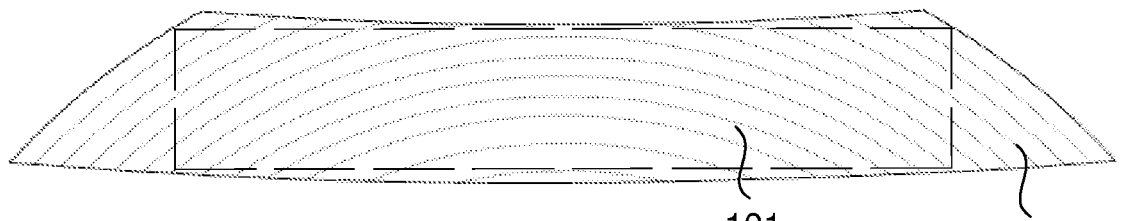
FIG. 3 is a schematic cross sectional view of a cupped plank.

Starting from a plank, which may be provided according to e.g. FIG. 2a or FIG. 2b, one or more longitudinal cracks are initiated and optionally opened. A longitudinal crack may be defined as a crack that extends along the longitudinal direction of the plank. Preferably, such a crack will propagate along a fiber direction of the plank, along the length direction and/or along the thickness direction.

In one alternative, the crack initialized, or cracked, plank may be laminated to at least one second layer when wet, as defined above, or after a drying step. In this variant, the plank members, to whom the plank is laminated may be dry or wet. The laminated product may then be subject to drying.

In another alternative, the crack initialized, or cracked, plank may be dried prior to lamination. In the latter case, the plank may need formatting, such as sanding and/or planing in order to restore a sufficiently planar shape to allow for lamination.

A cracked or crack-initiated plank is much more flexible than a non-cracked plank. In a planing machine the cracked plank can be pressed flat and the planing losses can thus be made much smaller compared to a conventional plank.

To this end, a planing step may be combined with a pressing step, wherein the plank is pressed, e.g. by a calendar arrangement, in the thickness direction while being planed. For example, a first set of calendar rolls may be arranged immediately upstream of the planing tool and a second set of calendar rolls may be arranged downstream of the planing tool.

Drying may also be performed in the conventional manner, such as kiln drying.

Figure 16:
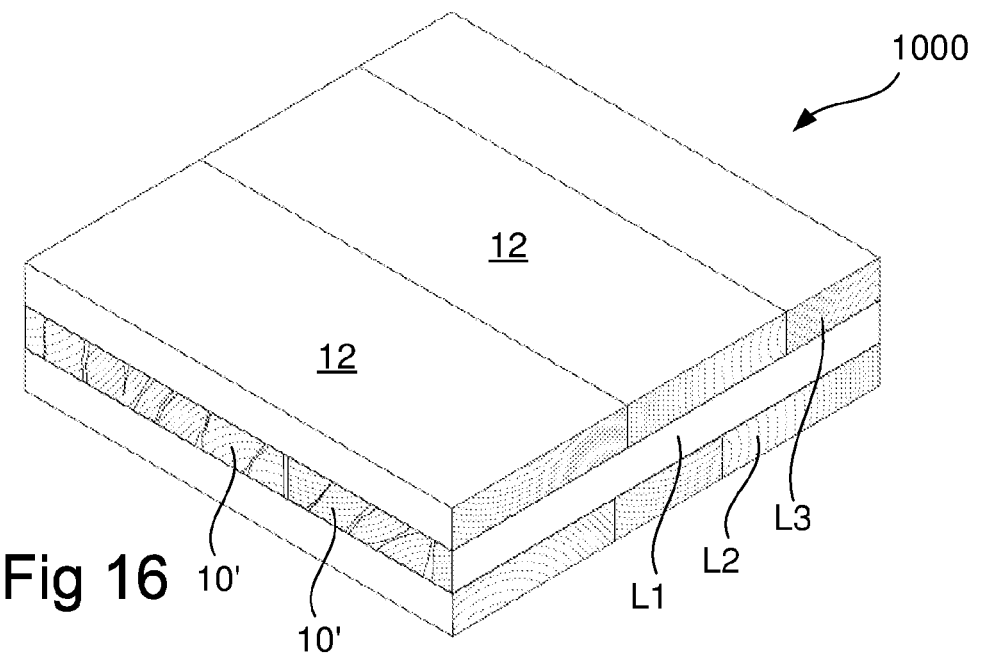
FIG. 16 is a schematic perspective view of cross laminated timber material (CLT) comprising cracked boards in a middle layer.

The thus crack initiated, or cracked, plank 10' may be included, alone, or arranged coplanarly with other planks 10', 12, as a layer L1 of a laminated wood product 1000, as shown in FIG. 16. In FIG. 16 there is seen an example of a laminated wood product 1000 according to the invention, wherein a middle layer L1 is made up by crack initiated or cracked boards 10', and adjacent, sandwiching outer layers L2, L3 are made from non-cracked planks.

As mentioned, the planks 10' may optionally have its initiated cracks opened, or completed. However, it is preferred that cracks are only opened or completed to an extent that allows the plank to still form one piece. That is, portions of the plank situated on different sides of a longitudinal crack should remain held together.

Lamination of the crack initiated or cracked planks 10' may be performed in conventional manner.

The lamination may take place using adhesive selected for the particular system that is to be laminated. For example, where at least one of the planks 10' that is to be laminated is wet, a wet gluing system may be used, such as polyurethane based glue.

The lamination may be supplemented by further measures, such as application of pressure, in particular in a direction perpendicular to a lamination plane (here the major surfaces), to the laminate in connection with the drying, setting or hardening of the adhesive.

In connection with the lamination, a catalyst or other reaction initiating measures may be supplied, such as radiation (UV light), heat or water (which is used in polyurethane systems).

That is, a plurality of crack initiated or cracked planks 10', 10" may be arranged coplanarly side by side, optionally with a minor gap between adjacent plank edges, whereby major surfaces of the planks 10' are laminated to major surfaces of further layers L2, L3.

Figure 17:
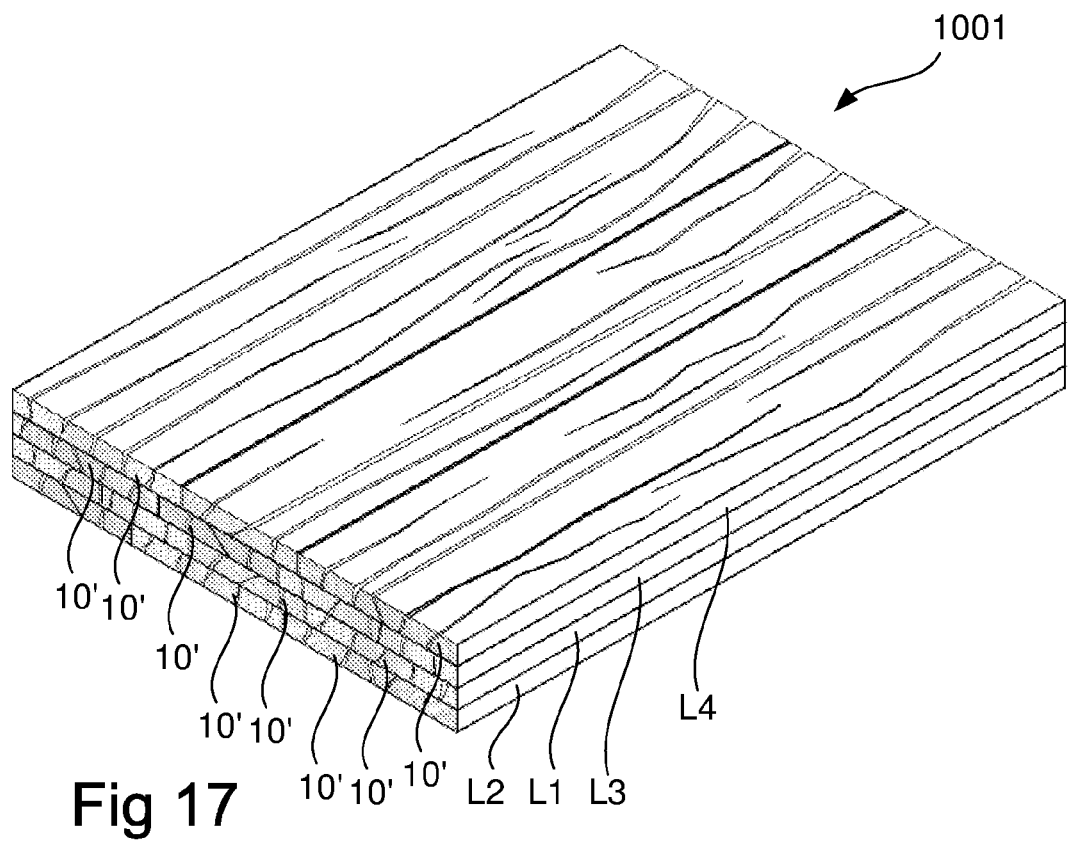
FIG. 17 is a schematic perspective view of a parallel laminated wood product.

The further layers L2, L3, L4 may comprise further crack initiated or cracked planks 10', 10", which may be arranged with their longitudinal directions parallel to the planks, but shifted laterally (in the width direction W), such that each crack/gap is bridged by the further plank. This is illustrated by the product 1001 in FIG. 17.

Alternatively, the further layers L2, L3 may comprise further crack initiated or cracked planks 10', 10", which may be arranged with their longitudinal directions at an angle other than parallel, such as perpendicular, to the planks, such that a cross laminated wood product is provided. This is illustrated in FIG. 16.

As yet further alternatives, one or more of the further layer(s) L2, L3 may comprise or consist of planks 12 that are neither (deliberately) cracked nor crack initiated, as illustrated in FIG. 16.

Figure 18:
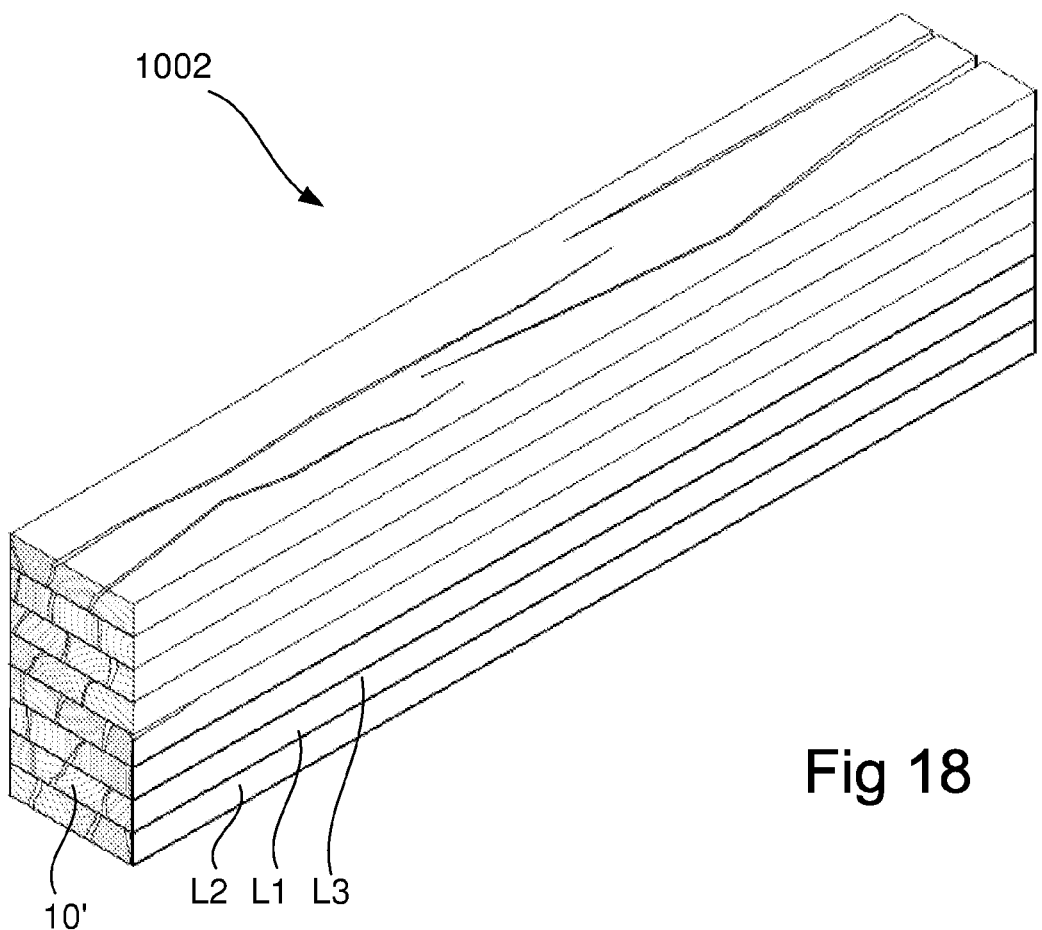
FIG. 18 is a schematic perspective view of a laminated wood beam.

As yet another alternative, cracked or crack initiated planks 10', 10" may be laminated major surface to major surface to provide a beam 1002, as illustrated in FIG. 18. In such a beam, some planks may be cracked or crack initiated and others may not be. For example outermost planks, as seen in the thickness direction T, may, for aesthetic reasons, be non-cracked.

The further layers with which the cracked or crack initiated planks are laminated may comprise, or consist of, other cracked or crack initiated planks, normal planks or board materials, such as fiber board, chip board, MDF, HDF or even polymer films, woven or non-woven webs or plastic sheets.

The description will now focus on the steps of initializing and opening cracks.

FIGS. 6-12b illustrate various ways of artificially initiating a crack in a wood plank.

FIGS. 6-9 illustrate various ways of initiating a longitudinal crack by wedging or cutting into a short edge of the plank.

Figure 6A:
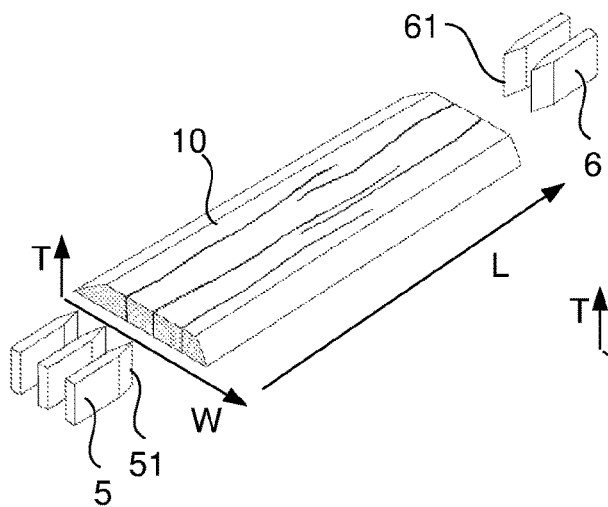
FIG. 6a is a schematic perspective view of a first device for initiating a crack.

In FIG. 6a, there is illustrated a trapezoidal (with respect to major surface shape) plank 10 and a plurality of wedging tools 5, 6. At the major short edge of the plank, three wedging tools 5 may be applied, each having a respective wedge edge 51, which extends perpendicular to the major surfaces of the plank, and which is driven into at least one end surface of the plank, substantially along the longitudinal direction.

It is understood that the wedge edge 51 may be oriented at an angle, as seen in a plane perpendicular to the major surface and to the short edges (i.e. a L-T plane) other than perpendicular to the end surface. It is also understood that the wedge may be driven in a direction which is not perpendicular to the end surface. Moreover, the wedge edge may be linear in shape, or it may be pointed, convex, concave, etc.

An extent of this wedging may be on the order of one or a few millimeters, up to one or a few (typically less than 5) centimeters, as the purpose may be to only initiate a crack, but not to complete it such that the pieces on opposite sides of the crack would separate.

Hence, it may be preferred to stop driving the wedge 5, 6 before a crack starts propagating from the notch formed by the wedge, or immediately on detection of a start of such propagation.

As illustrated in FIG. 6a, more than one crack may be initiated, such that multiple longitudinal cracks are provided.

Cracks may typically be initiated with a spacing, as seen in a direction W transversely of the longitudinal direction L, of 50-200% of a thickness T of the plank, preferably about 50-150%, 75-150% or 100-150% of such thickness T.

As illustrated in FIG. 6a, cracks C1, C2, C3 may, but need not, be initiated from both ends of a plank 10. In the illustrated example, three cracks are initiated by first wedging tools 5 from the major end surface and two cracks are initiated by second wedging tools 6 from the minor end surface. Hence, the number of cracks initiated at a minor end surface may be on the order of n–a, where n is the number of cracks initiated at the major end surface and a is an integer value of 0-3.

Figure 7:
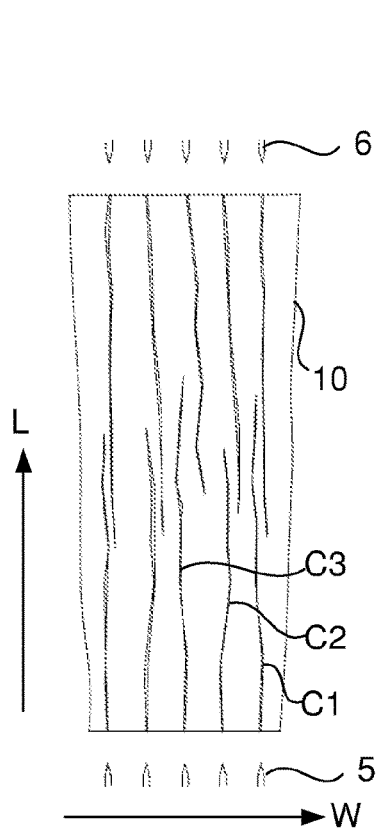
FIG. 7 is a schematic planar view of a third device for initiating a crack.

Referring to FIG. 7, there is illustrated a case where the number of a is 0, that is, the number of cracks C1, C2, C3 initiated at each short edge are the same. Other than that, the device illustrated in FIG. 7 operates in the same manner as that of FIG. 6a.

Figure 6B:
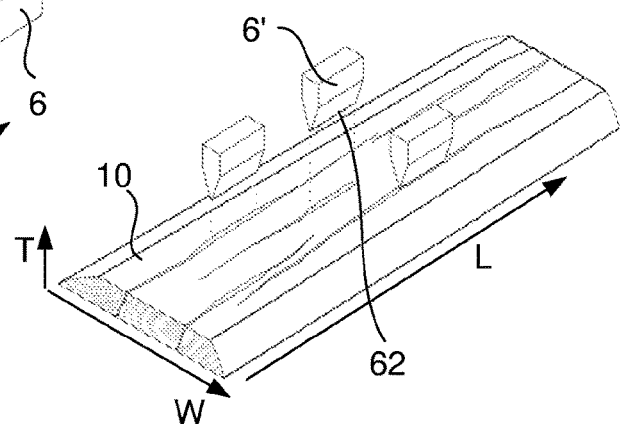
FIG. 6b is a schematic perspective view of a second device for initiating a crack.

Referring to FIG. 6b, there is illustrated another way of initiating cracks.

Here, cracks are initiated on the major surfaces using a device, wherein one or more wedging tools 6' are caused to perform an oscillating motion in a direction perpendicular to the major surfaces. That is, the wedging tools 6' will reciprocate towards and away from the major surface, forming, at each cycle, a longitudinally extending elongate dent in the major surface.

The wedging tools 6' may have their wedge edges 62 parallel with the longitudinal direction L, and optionally also with the major surface towards which it is to act.

Longitudinal spacing of such dents may be varied by varying the oscillation frequency and/or the speed with which the plank is being fed past the wedging tool. Hence, it is possible to provide everything from a continuous groove along the length of the plank to one or a few separate dents along the length of each plank.

Optionally, the wedging tools may be controllably movable in the transverse direction, such that the groove formed by each wedging tool may follow fibers of the wood.

As yet another option, the wedging tools may be rotatable about an axis perpendicular to the major surface, such that the orientation of the wedge edge 62 may be tuned to follow fiber direction in the major surface. The rotation may be limited to +/−20°, +/−10° or +/−5°, relative to the longitudinal axis L.

It is noted that methods, e.g. based on image analysis, of determining fiber direction are known.

Such wedging tools may be provided to operate on one or both major surfaces of the plank.

Figure 8:
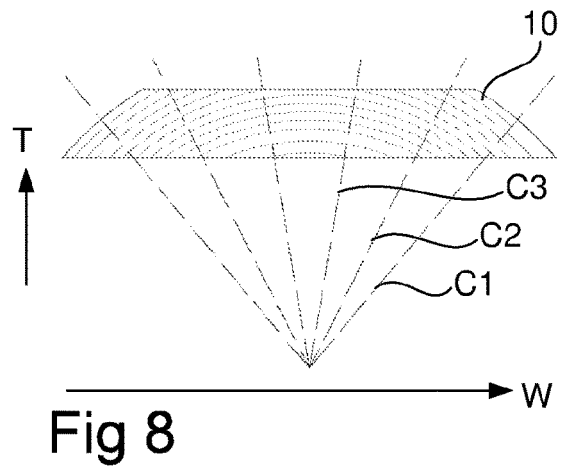
FIG. 8 is a schematic view of a first principle for initiating cracks.

FIG. 8 illustrates a first principle of orienting the wedge edges in FIG. 6 or 7. Here, the wedge edges are aligned with year ring radii of the plank, or actually of the log from which the plank was formed. For example, it is possible to achieve this by analyzing curvature of year rings of the plank, derive a tangent of each year ring at each lateral position where a crack is to be initiated, and to align the wedge edge 51, 61 such that it is perpendicular to the tangent of the year ring at that position.

This mimics the natural cracking of a wood log, which is caused by differences in drying-induced shrinking at different radial portions of the log 1.

Figure 9:
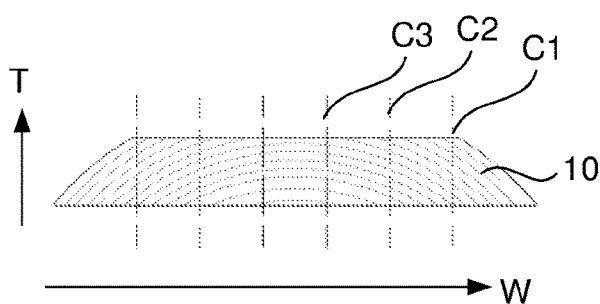
FIG. 9 is a schematic view of a second principle for initiating cracks.

FIG. 9 illustrates the principle used in FIGS. 6a and 7. That is, the wedge edges 51, 61 are simply arranged perpendicular to the major surface.

FIGS. 10-12b illustrate various ways of initiating a longitudinal crack by wedging or cutting into a major surface of the plank.

Figure 10:
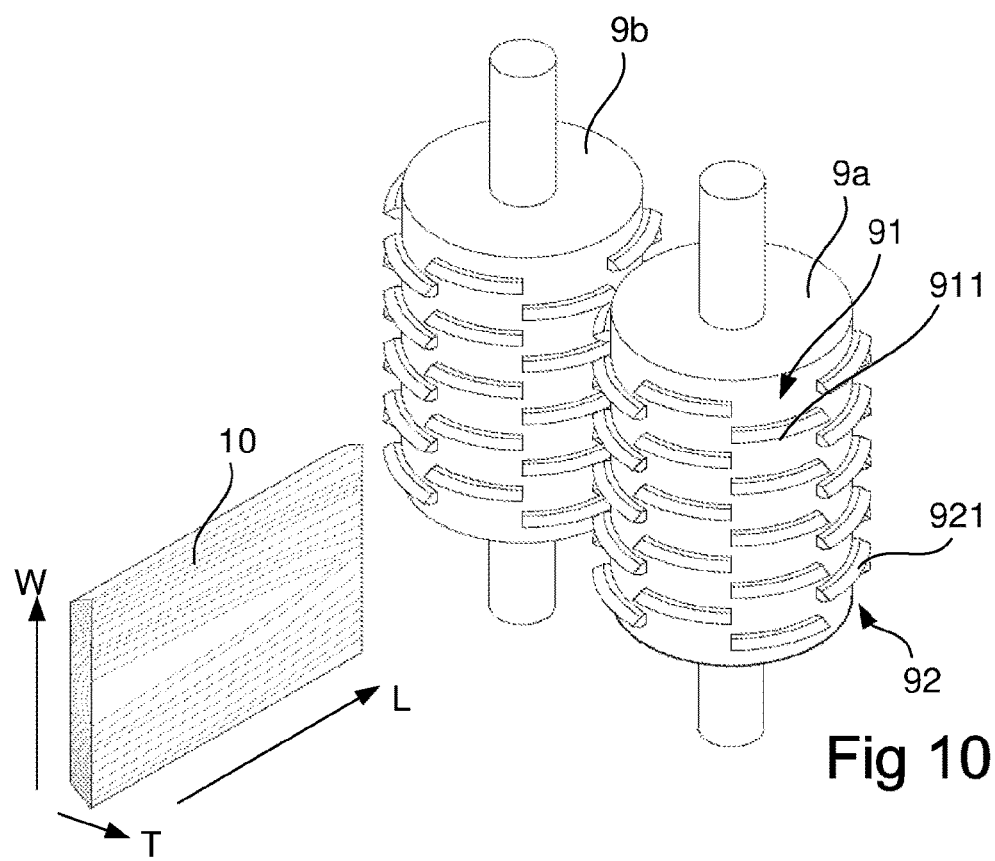
FIG. 10 is a schematic perspective view of a fourth device for initiating a crack.

In FIG. 10, there is illustrated a first way of wedging into a major surface of the plank.

As illustrated in FIG. 10, it is possible cause at least one calendar 9a, 9b having a cutting edge 911, 921 extending along a portion of its circumference to interact with a major surface of the plank while the plank and the calendar 9a, 9b move relative each other.

In the illustrated embodiment, it is contemplated that the calendar 9a, 9b is stationary and rotatable, whereby the plank is passed by it while being pressed against the calendar. However, it is possible to keep the plank stationary and move the calendar(s) instead.

Moreover, it is contemplated to provide a pair of calendars 9a, 9b, each having such partially circumferential cutting edges 911, 921.

In such a device, the plank may be propelled by the calendars 9a, 9b, and both surfaces may be crack-initiated at the same time.

As mentioned, each calendar 9a, 9b may comprise at least one circumferential cutting edge 911, 921. However, it may be rational to provide more such circumferential cutting edges 911, 921.

For example, a first set 91 of partially circumferential cutting edges 911 may be axially aligned and spaced from each other.

An axial spacing between adjacent cutting edges 911 may be on the order of the crack spacing mentioned above, as seen in a direction W transversely of the longitudinal direction L. That is 50-200% of a thickness T of the plank, preferably about 50-150%, 75-150% or 100-150% of such thickness T.

One or more further sets 92 of partially circumferential cutting edges 921 may be axially aligned and spaced from each other, and optionally axially offset from the first set 91. Preferably, this further set may also be angularly offset from the first set.

For example, each partially circumferential cutting edge 911, 921 may extend over a portion of the circumference corresponding to about 10°-45° angle about a central axis of the calendar. That is, a length of the cutting edge 911, 921 may correspond to about 10°-45° of the central angle.

A circumferential offset between two adjacent sets 91, 92 of cutting edges 911, 921 may be on the order of 50-150% of the cutting edge length.

One or both calendars 9a, 9b may be provided with cutting edges 911, 921.

Hence, in one embodiment, both calendars 9a, 9b have cutting edges 911, 921, as illustrated in FIG. 10.

In another embodiment, only one of the calendars have cutting edges, while the other one merely provides support and assists in driving the plank, and pressing it towards the calendar having cutting edges.

Figure 11:
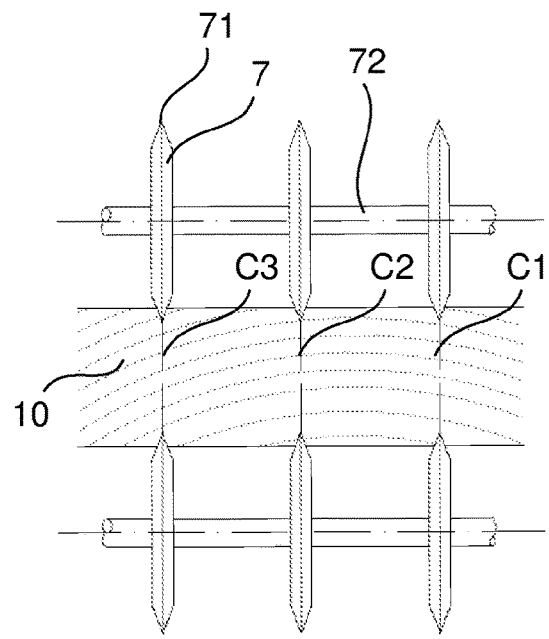
FIG. 11 is a schematic perspective view of a fifth device for initiating a crack.

In FIG. 11, there is illustrated another way of initiating cracks C1, C2, C3.

Here, each crack initiating tool 7 is formed by a rotatable cutting disk, having a continuous (possibly non-serrated) cutting edge 71, which, depending on its sharpness and the force applied, wedges into and/or cuts into at least one of the major surfaces of the plank 10. In the illustrated example, a respective set of tools is operable on each major surface of the plank 10.

This cutting edge 71 may be caused to move relative to the plank in a substantially slip-free manner, i.e. there is no relative movement between the cutting disk edge 71 and the plank 10.

Optionally, the cutting disks 7 may be controllably movable in the transverse direction, such that the groove or cut formed by each grooving tool may follow fibers of the wood.

The cutting disks 7 may be individually rotatable, each independently with regard to other disks on the same axle 72 or major surface, or rotatable as a group on a common axle.

A common denominator of the methods illustrated in FIGS. 10 and 11, and also FIGS. 6 and 7 is the absence of removal of material.

Figure 12A:
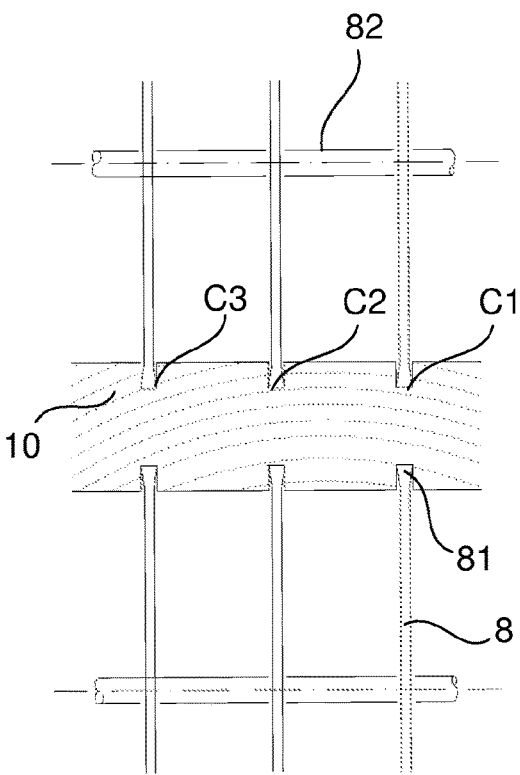
FIG. 12a-12b is a schematic perspective view of a sixth device for initiating a crack.

In FIG. 12a, there is illustrated yet another way of initiating cracks.

Here, a plurality of rotatable saw blades 8 are provided, each of which presenting a saw edge 81 for cutting a shallow groove in the major surface of the plank. Thus, material is being removed from these grooves.

Optionally, the saw blades 8 may be controllably movable in the transverse direction, such that the groove formed by each saw blade 7 may follow fibers of the wood.

The saw blades 8 may be individually rotatable, each independently with regard to other disks on the same axle or major surface, or rotatable as a group on a common axle 82.

As illustrated in FIG. 12*a*, the cutting depth may be relatively shallow, preferably on the order of 5-35%, preferably 5-25%, of the thickness of the plank. This way, the amount of material removed is reduced.

Figure 12B:
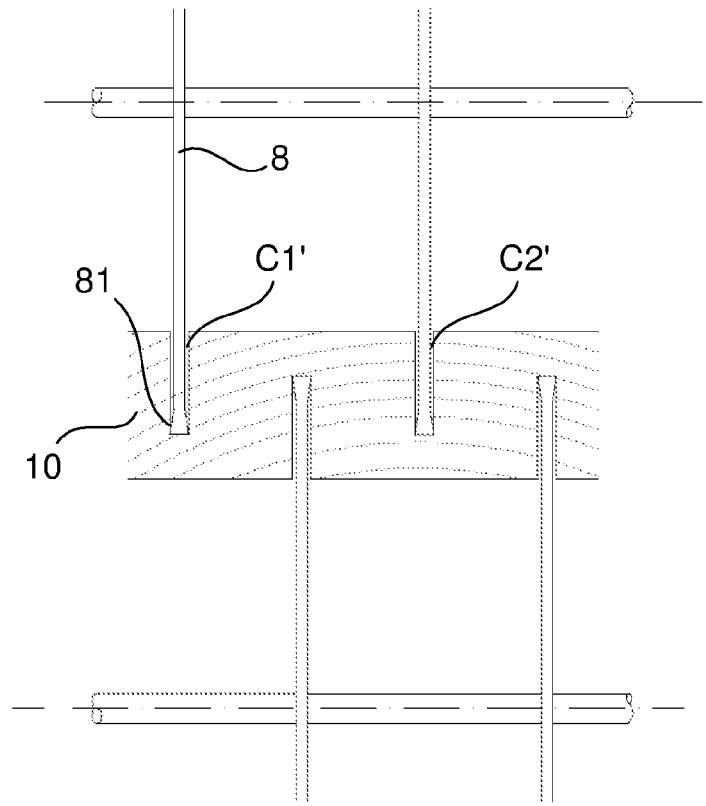

Referring to FIG. 12*b*, cutting depth of the saw blades 8 may be as much as 50-90% of the thickness of the plank 10, possibly 70-90% or 80-90%.

Hence, the cuts C1', C2' may extend over more than half of the plank thickness, which will further facilitate any subsequent cracking process.

The description will now focus on how to wholly or partially open or complete longitudinal cracks in a plank. Each of the opening methods disclosed below may be used with any of the crack initiation methods disclosed above.

Figure 13:
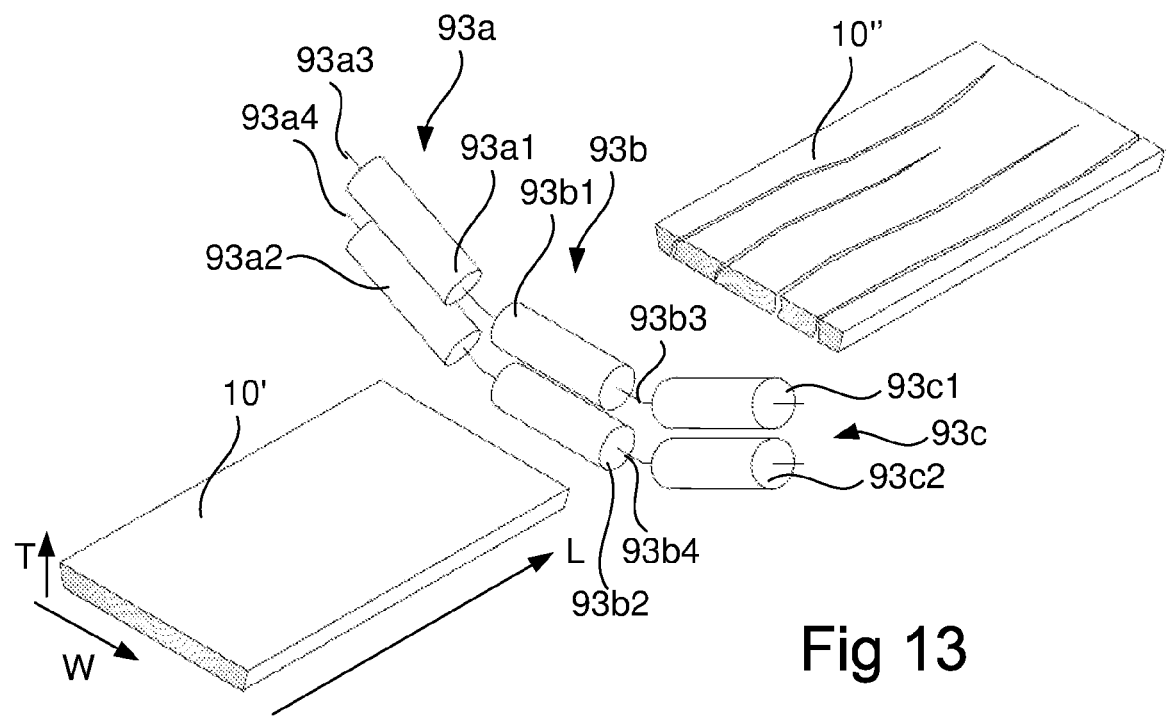
FIG. 13 is a schematic perspective view of a first device for cracking a plank.

Referring to FIG. 13, there is illustrated a first device for opening, or completing, cracks. This device comprises at least two pairs 93*a*, 93*b*, 93*c* of rollers 93*a*1, 93*a*2; 93*b*1, 93*b*2; 93*c*1, 93*c*2, wherein the rollers 93*a*1, 93*a*2 of a first pair 93*a* are rotatable about first mutually parallel axes 93*a*3, 93*a*4 and wherein the rollers 93*b*1, 93*b*2 of the second pair are rotatable about second mutually parallel axes. The first and second parallel axes 93*b*3, 93*b*4 present an angle of 5°-45°, preferably 10°-30°.

The pairs 93*a*, 93*b*, 93*c* of rollers simultaneously engage laterally (in the W direction) juxtaposed portions of the plank 10, 10', typically (but not necessarily) a crack-initiated plank 10', such that a bending torque is applied to the plank about an axis parallel with the longitudinal direction L of the plank.

The plank 10' is fed along its longitudinal direction L through the roller pairs 93*a*, 93*b*, 93*c*, and is thus successively bent and thus cracked.

The plank may optionally be passed through at least two successive set of rollers, wherein the angle between the axes of the roller sets gradually increase.

When the plank 10" has been passed through the device of FIG. 13, it will typically be cracked. However, as mentioned, it is desirable, and the device may be accordingly adjusted, only to crack the plank to such an extent that it still forms an integral piece of material.

Figure 14:
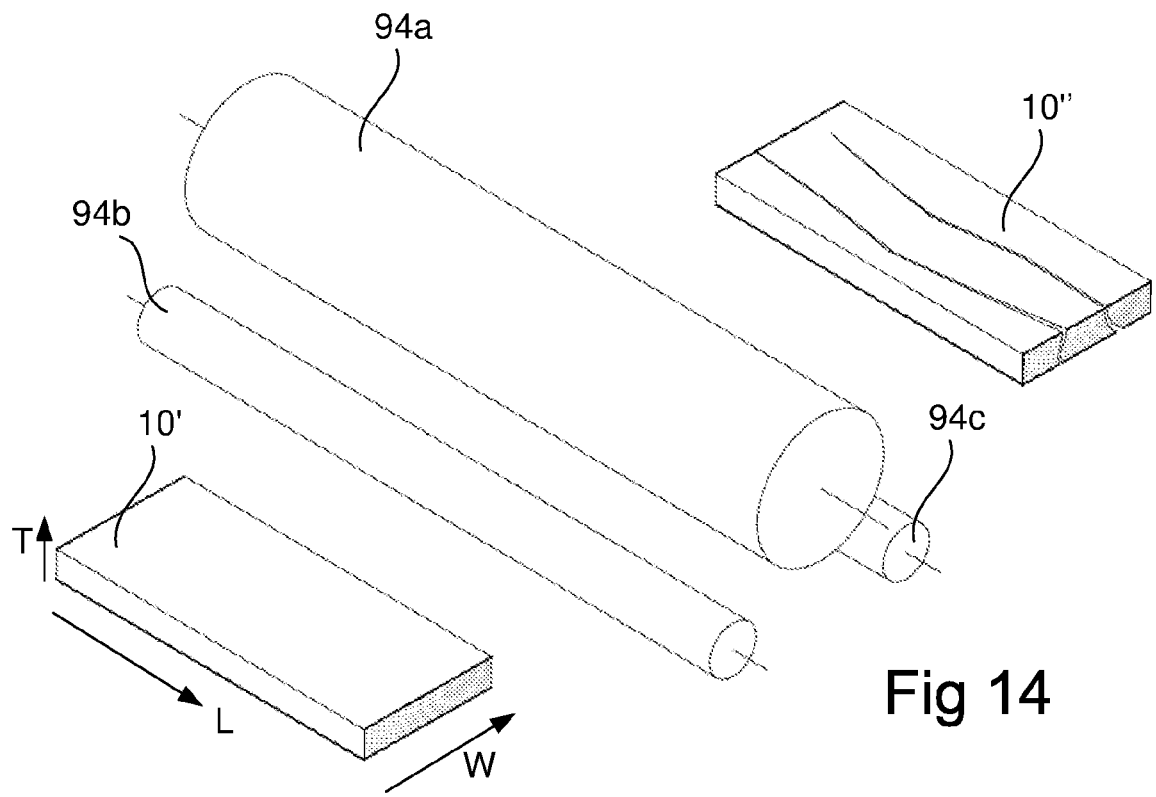
FIG. 14 is a schematic perspective view of a second device for cracking a plank.

Referring to FIG. 14, there is illustrated a second device for opening cracks. This device comprises at least three rollers 94*a*, 94*b*, 94*c*, one of which 94*a* arranged to engage a first major surface of the plank and the others 94*b*, 94*c* arranged to simultaneously engage the second major surface of the plank, which may be pristine or crack-initiated.

The rollers 94*a*, 94*b*, 94*c* are arranged such that a line that tangents both second rollers 94*b*, 94*c* at points facing the first roller 94*a* presents a minimum distance to the periphery of the first roller 94*a*, which minimum distance is less than a thickness of the plank that is to be processed, preferably less than 75% of said thickness or less than 50% of said thickness. The distance may be zero or negative. That is, the periphery of the first roller may tangent or intersect said line.

The plank 10, 10' may be passed through the rollers along its transversal direction. The rollers may be of length equal to the plank.

When the plank 10" has been passed through the device of FIG. 13, it will typically be cracked. However, as mentioned, it is desirable only to crack the plank to such an extent that it still forms an integral piece of material. In the alternative, two or more sets of spaced apart rollers may be provided.

Figure 15:
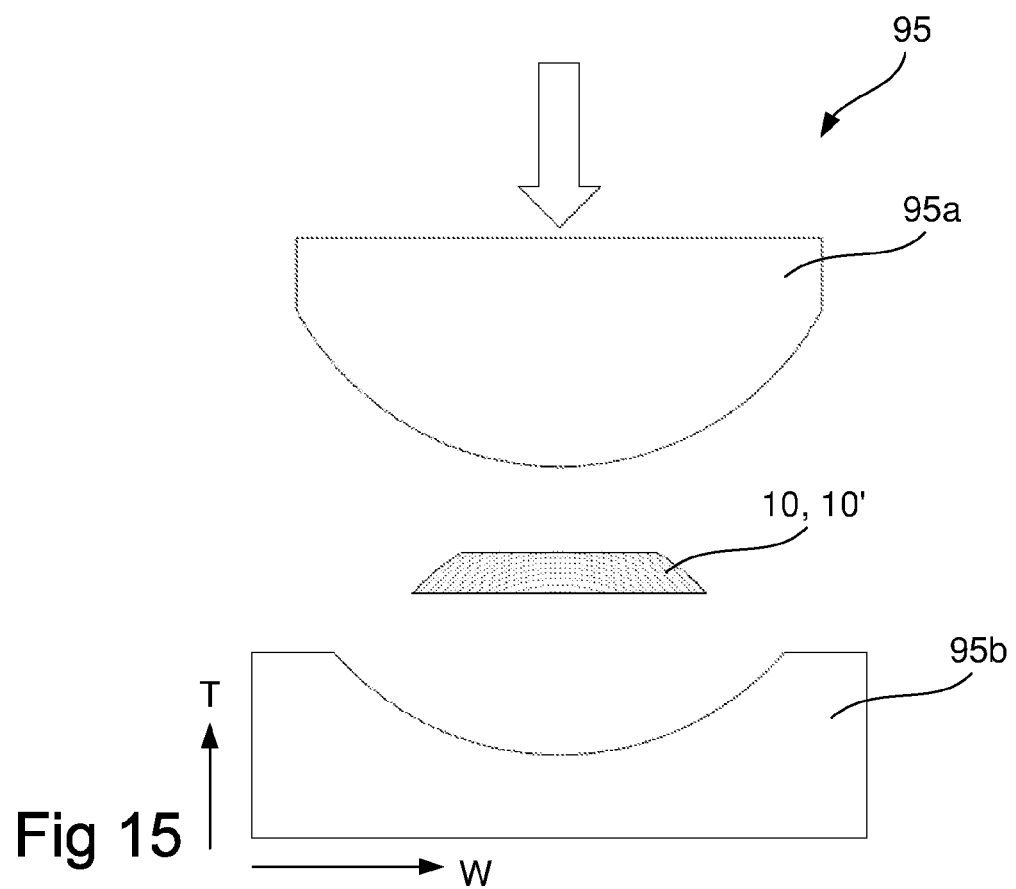
FIG. 15 is a schematic perspective view of a third device for cracking a plank.

Referring to FIG. 15, there is illustrated a third device 95 for opening cracks. This device comprises a pair of profiled members 95*a*, 95*b*, one 95*b* of which being concave and the other one 95*a* being convex.

The profiled members 95*a*, 95*b* may be provided as a pressing tool, wherein one or more planks 10, 10' are cracked in each cycle.

Alternatively, the profiled members 95*a*, 95*b* may be formed as rollers, whereby the plank 10, 10' may be passed between the rollers in a manner similar to that illustrated in FIG. 13.

The invention claimed is:

1. A method of producing a laminated wood product comprising:
   providing a plank presenting a pair of parallel major surfaces, a pair of minor surfaces, a pair of end surfaces and a longitudinal direction parallel with said major and minor surfaces and perpendicular to the end surfaces, said plank having a water content of more than 25% by weight,
   initializing at least one longitudinal crack in the plank, forming a crack initialized plank,
   drying said crack initialized plank to a moisture content of less than 20% by weight, and
   laminating said crack initialized plank by gluing at least one of its major surfaces to a surface of a second member, thus forming the laminated wood product.

2. The method as claimed in claim 1, wherein said initializing comprises wedging into the plank.

3. The method as claimed in claim 2, wherein the wedging is performed towards at least one of the end surfaces.

4. The method as claimed in claim 2 wherein said wedging is performed with a wedge edge, which is oriented substantially perpendicular to the major surfaces.

5. The method as claimed in claim 2, wherein said wedging is performed with a wedge edge, which is oriented substantially perpendicular to a year ring tangent where the wedge edge engages the end surface.

6. The method as claimed in claim 2, wherein a wedge edge is driven into the end surface less than 5% of a plank length.

7. The method as claimed in claim 1, wherein said initializing comprises providing a longitudinal notch in at least one of the major surfaces.

8. The method as claimed in claim 7, wherein providing the longitudinal notch comprises wedging or cutting into the major surface.

9. The method as claimed in claim 7, wherein providing the longitudinal notch comprises sawing or milling into the major surface.

10. The method as claimed in claim 7 wherein the notch is continuous over at least 50% of a length of the plank.

11. The method as claimed in claim 7, wherein the notch is discontinuous and presents at least two aligned notch sections of less than 45% of a length of the plank.

12. The method as claimed in claim 7, wherein a notch depth is less than 90% of a plank thickness.

13. The method as claimed in claim 2, further comprising measuring a wedging force, wherein said wedging is performed until the wedging force starts decreasing.

14. The method as claimed in claim 1, wherein said initializing comprises cutting into the plank.

15. The method as claimed in claim 14, wherein the cutting comprises removing material in a form of dust or chips.

16. The method as claimed in claim 14, wherein the cutting is performed towards an end surface of the plank.

17. The method as claimed in claim 14, wherein the cutting is performed towards a major surface of the plank.

18. The method as claimed in claim 1, wherein at least two laterally spaced cracks are initiated along respective substantially longitudinal directions of one major surface.

19. The method as claimed in claim 18, wherein the at least two laterally spaced cracks are spaced apart by a distance corresponding to a thickness of the plank+/−25%.

20. The method as claimed in claim 1, further comprising obtaining data on fiber directions of at least part of the at least one of the major surfaces and initiating at least one crack parallel with such fiber direction.

21. The method as claimed in claim 1, further comprising opening at least one initiated crack, forming an opening.

22. The method as claimed in claim 21, wherein said opening comprises applying a torque about an axis parallel with the longitudinal direction of the plank.

23. The method as claimed in claim 1, wherein the plank, prior to said drying, has a water content of less than 40% by weight.

24. The method as claimed in claim 1, wherein the laminating is performed before the drying step.

25. The method as claimed in claim 1, wherein the second member presents a water content of less than 25% by weight.

26. The method as claimed in claim 1, wherein the second member presents a water content of more than 25% by weight.

27. The method as claimed in claim 1, further comprising a sanding step and/or a planing step of at least one of the major surfaces after the drying and prior to the laminating.

28. The method as claimed in claim 1, wherein the laminating is performed after the drying step.

29. The method as claimed in claim 27, wherein the second member presents a water content of less than 25% by weight.

30. The method as claimed in claim 1, wherein the plank is formed of hardwood, having a dry wood density of more than 400 kg/m3, or from softwood.

* * * * *